United States Patent
Yamamura et al.

(10) Patent No.: US 11,803,187 B2
(45) Date of Patent: Oct. 31, 2023

(54) AUTONOMOUS WORK SYSTEM, AUTONOMOUS WORK SETTING METHOD, AND STORAGE MEDIUM

(71) Applicant: HONDA MOTOR CO., LTD., Tokyo (JP)

(72) Inventors: Makoto Yamamura, Wako (JP); Masaya Honji, Wako (JP); Tsukasa Sugino, Wako (JP); Takayuki Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 17/209,272

(22) Filed: Mar. 23, 2021

(65) Prior Publication Data

US 2021/0302980 A1 Sep. 30, 2021

(30) Foreign Application Priority Data

Mar. 27, 2020 (JP) .................. 2020-057497

(51) Int. Cl.
*G05D 1/02* (2020.01)
*A01D 34/00* (2006.01)
*G05D 1/00* (2006.01)

(52) U.S. Cl.
CPC ......... *G05D 1/0217* (2013.01); *A01D 34/008* (2013.01); *G05D 1/0027* (2013.01);
(Continued)

(58) Field of Classification Search
CPC .. G05D 1/0217; G05D 1/0027; G05D 1/0219; G05D 1/0238; G05D 2201/0208; A01D 34/008
(Continued)

(56) References Cited

U.S. PATENT DOCUMENTS

2016/0000289 A1  1/2016 Senoo et al.
2017/0280622 A1  10/2017 Yamamura
(Continued)

FOREIGN PATENT DOCUMENTS

CN  108602188 A  *  9/2018  ............ B25J 9/1664
CN  113625701 A  *  11/2021
(Continued)

OTHER PUBLICATIONS

Japanese Notice of Allowance for Japanese Patent Application No. 2020-057497 dated May 23, 2023.

*Primary Examiner* — Mahmoud Gimie
(74) *Attorney, Agent, or Firm* — AMIN, TUROCY & WATSON, LLP

(57) ABSTRACT

An autonomous work system includes a first work machine, a second work machine, and a setting apparatus, in which the setting apparatus sets a part of an entire work region as a first work region in which the first work machine performs work, and calculates a first work time required for the first work machine to perform the work in the first work region, sets a region other than the first work region in the entire work region as a second work region in which the second work machine performs work, and calculates a second work time required for the second work machine to perform the work in the second work region, changes the first work region and the second work region such that a difference between the first work time and the second work time is within a predetermined value, transmits information regarding the changed first work region to the first work machine, and transmits information regarding the changed second work region to the second work machine.

6 Claims, 9 Drawing Sheets

(52) U.S. Cl.
CPC ......... *G05D 1/0219* (2013.01); *G05D 1/0238* (2013.01); *G05D 2201/0208* (2013.01)

(58) Field of Classification Search
USPC .......................................... 701/26
See application file for complete search history.

(56) References Cited

U.S. PATENT DOCUMENTS

| | | |
|---|---|---|
| 2017/0285630 A1 | 10/2017 | Yamamura |
| 2017/0364091 A1 | 12/2017 | Bennett et al. |
| 2019/0346848 A1* | 11/2019 | Zhou .................... G05D 1/0276 |
| 2020/0064832 A1 | 2/2020 | Matsui et al. |
| 2023/0147624 A1* | 5/2023 | Gaud .................. G05D 1/0274 701/26 |

FOREIGN PATENT DOCUMENTS

| | | |
|---|---|---|
| JP | 2009-199359 | 9/2009 |
| JP | 2014-200449 | 10/2014 |
| JP | 2014-230667 | 12/2014 |
| JP | 2017-176115 | 10/2017 |
| JP | 2017-176116 | 10/2017 |
| JP | 2018-041356 | 3/2018 |
| JP | 2019-003630 | 1/2019 |
| WO | 2018/142791 | 8/2018 |

* cited by examiner

AUTONOMOUS WORK SYSTEM, AUTONOMOUS WORK SETTING METHOD, AND STORAGE MEDIUM

CROSS-REFERENCE TO RELATED APPLICATION

Priority is claimed on Japanese Patent Application No. 2020-057497, filed Mar. 27, 2020, the content of which is incorporated herein by reference.

BACKGROUND OF THE INVENTION

Field of the Invention

The present invention relates to an autonomous work system, an autonomous work setting method, and a storage medium.

Description of Related Art

In a case where work is performed in a work region such as a park, a golf course, or a field, for example, work to be performed is decided on the basis of experience of a worker, and the work is performed by a person.

For example, a system has been proposed in which, in a case where a plurality of tractors are made to autonomously perform work in a farming field, a work mode and a work route are changed according to a change in the number of working tractors (for example, refer to Japanese Unexamined Patent Application, First Publication No. 2018-41356 (hereinafter, Patent Document 1)).

A system has been proposed in which, in a case where a plurality of floor treatment apparatuses are used to clean a room, the plurality of floor treatment apparatuses interact with each other and assist each other in accordance with a predetermined rule assigned to a shared database. In this system, a control device that can communicate with the floor treatment apparatuses detects an obstacle or dirt with a distance measurement system to create a region map, and generates a movement plan for each floor treatment apparatus by using the region map. The plurality of floor treatment apparatuses may be different from each other, and, for example, a first floor treatment apparatus may be a dry cleaning apparatus and a second floor treatment apparatus may be a wet cleaning apparatus. For example, in a case where the first floor treatment apparatus fails in work, the control device causes the second floor treatment apparatus to perform work on the basis of a plan that is made in advance (for example, refer to Japanese Unexamined Patent Application, First Publication No. 2019-3630 (hereinafter, Patent Document 2)).

SUMMARY OF THE INVENTION

In the techniques disclosed in Patent Documents 1 and 2, even if an autonomous work machine recognizes a working capacity and a work region thereof, the autonomous work machine does not share the information with other autonomous work machines, and thus there is a problem in that work cannot be shared.

Aspects related to the present invention have been made in light of this problem, and an object thereof is to provide an autonomous work system, an autonomous work setting method, and a storage medium capable of maximizing work efficiency when work is performed by using a plurality of devices.

In order to solve the problem and to achieve the object, the present invention employs the following aspects.

(1) According to an aspect of the present invention, there is provided an autonomous work system including a first work machine; a second work machine; and a setting apparatus, in which the setting apparatus sets a part of an entire work region as a first work region in which the first work machine performs work, and calculates a first work time required for the first work machine to perform the work in the first work region, sets a region other than the first work region in the entire work region as a second work region in which the second work machine performs work, and calculates a second work time required for the second work machine to perform the work in the second work region, changes the first work region and the second work region such that a difference between the first work time and the second work time is within a predetermined value, transmits information regarding the changed first work region to the first work machine, and transmits information regarding the changed second work region to the second work machine.

(2) In the aspect (1), the setting apparatus may compare a working capacity of the first work machine with a working capacity of the second work machine, and set a work machine having a higher working capacity as the first work machine, and sets an area of the first work region on the basis of the working capacity of the first work machine.

(3) In the aspect (1) or (2), the setting apparatus may acquire obstacle information indicating a position of an obstacle from at least one of the first work machine and the second work machine, and change the first work region and the second work region on the basis of the acquired obstacle information.

(4) In any one of the aspects (1) to (3), the first work machine and the second work machine may be lawnmowers, and, in a case where a working capacity of the first work machine is higher than a working capacity of the second work machine, the setting apparatus may set at least a boundary portion of the entire work region as the second work region.

(5) According to another aspect of the present invention, there is provided an autonomous work setting method including setting a part of an entire work region as a first work region in which a first work machine performs work, and calculating a first work time required for the first work machine to perform the work in the first work region; setting a region other than the first work region in the entire work region as a second work region in which a second work machine performs work, calculating a second work time required for the second work machine to perform the work in the second work region, and changing the first work region and the second work region such that a difference between the first work time and the second work time is within a predetermined value; transmitting information regarding the changed first work region to the first work machine; and transmitting information regarding the changed second work region to the second work machine.

(6) According to still another aspect of the present invention, there is provided a program causing a computer to execute setting a part of an entire work region as a first work region in which a first work machine performs work; calculating a first work time required for the first work machine to perform the work in the first work region; setting a region other than the first work region in the entire work region as a second work region in which a second work machine performs work; calculating a second work time required for the second work machine to perform the work in the second work region; changing the first work region and the second work region such that a difference between the first work time and the second work time is within a predetermined value; transmitting information regarding the changed first work region to the first work machine; and transmitting information regarding the changed second work region to the second work machine.

According to the aspects (1) to (6), work times of a plurality of work machines match each other, and thus it is possible to maximize work efficiency when work is performed by using the plurality of work machines.

According to the aspect (2), work times of a plurality of work machines match each other on the basis of capacities of the work machines, and thus it is possible to maximize work efficiency when work is performed by using the plurality of work machines.

According to the aspect (3), in a case where an obstacle is present in a work region, work regions of a plurality of work machines are changed, and thus it is possible to maximize work efficiency when work is performed by using the plurality of work machines.

According to the aspect (4), work regions are set on the basis of capacities of a plurality of work machines, and thus it is possible to maximize work efficiency when work is performed by using the plurality of work machines.

DETAILED DESCRIPTION OF THE INVENTION

Figure 1:
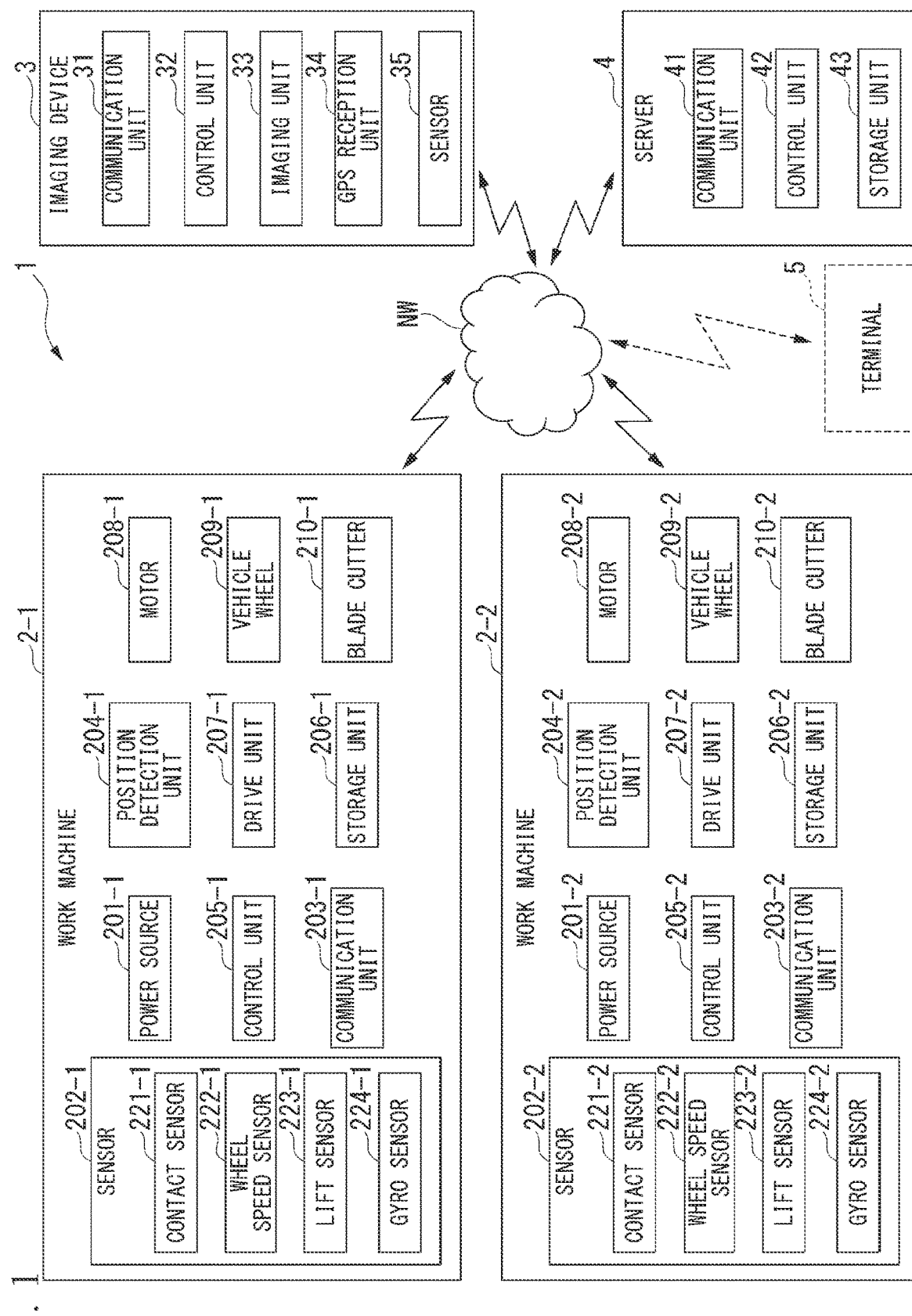
FIG. 1 is a block diagram illustrating a configuration example of an autonomous work system according to an embodiment.

Hereinafter, an embodiment of the present invention will be described with reference to the drawings. In the drawings used for the following description, a scale of each member is changed as appropriate such that each member has a recognizable size.

<Configuration of Autonomous Work System 1>

A configuration example of an autonomous work system 1 will be described.

FIG. 1 is a block diagram illustrating a configuration example of the autonomous work system 1 according to the present embodiment. As illustrated in FIG. 1, the autonomous work system 1 includes a first work machine 2-1 (first work machine), a second work machine 2-2 (second work machine), an imaging device 3, and a server 4 (setting apparatus). In the following description, in a case where neither of the first work machine 2-1 and the second work machine 2-2 is specified, the work machines will be referred to as a work machine 2. The autonomous work system 1 includes at least two work machines 2. The autonomous work system 1 may include a terminal 5 such as a smartphone or a tablet terminal.

The first work machine 2-1, the second work machine 2-2, the imaging device 3, the server 4, and the terminal 5 are connected to each other through wireless communication via a network NW. The network NW is, for example, the Internet or a wireless local area network (LAN).

An n-th (where n is 1 or 2) work machine 2-$n$ includes a power source 201-$n$, a sensor 202-$n$, a communication unit 203-$n$, a position detection unit 204-$n$, a control unit 205-$n$, a storage unit 206-$n$, a drive unit 207-$n$, a motor 208-$n$, vehicle wheels 209-$n$, and a blade cutter 210-$n$. The sensor 202-$n$ includes a contact sensor 221-$n$, a wheel speed sensor 222-$n$, a lift sensor 223-$n$, and a gyro sensor 224-$n$. Configurations of the first work machine 2-1 and the second work machine 2-2 may be the same as or different from each other.

In the following description, in a case where n is not specified, the power source 201-$n$, the sensor 202-$n$, the communication unit 203-$n$, the position detection unit 204-$n$, the control unit 205-$n$, the storage unit 206-$n$, the drive unit 207-$n$, the motor 208-$n$, the vehicle wheels 209-$n$, the blade cutter 210-$n$, the contact sensor 221-$n$, the wheel speed sensor 222-$n$, the lift sensor 223-$n$, and the gyro sensor 224-$n$ will be respectively referred to as a power source 201, a sensor 202, a communication unit 203, a position detection unit 204, a control unit 205, a storage unit 206, a drive unit 207, a motor 208, vehicle wheels 209, a blade cutter 210, a contact sensor 221, a wheel speed sensor 222, a lift sensor 223, and a gyro sensor 224.

The imaging device 3 includes a communication unit 31, a control unit 32, an imaging unit 33, a GPS reception unit 34, and a sensor 35.

The server 4 includes a communication unit 41, a control unit 42, and a storage unit 43.

<Function of Work Machine 2>

Next, functions of the work machine 2 will be described.

The work machine 2 is an unmanned traveling lawnmower (a so-called robot-type lawnmower) that can independently travel to mow grass. In the following description, an example in which a working capacity of the first work machine 2-1 is higher than a working capacity of the second work machine 2-2 will be described. The first work machine 2-1 is suitable for work in, for example, a central region of a work region having few obstacles and no deformed region. The second work machine 2-2 has a small turning radius, and is thus suitable for work in, for example, a peripheral region of a work region or a region having an obstacle.

The power source 201 is, for example, a chargeable secondary battery. The power source 201 may be replaceable, for example, in a pack method. The power source 201 supplies power to each functional unit.

The contact sensor 221 is, for example, an infrared sensor, a reflective sensor, or a time of flight (ToF) sensor. The contact sensor 221 outputs an ON signal to the control unit 205 when a frame 252$b$ (refer to FIG. 2) of the work machine 2 deviates from a chassis 252$a$ (refer to FIG. 2) due to contact with an obstacle or a foreign substance.

The wheel speed sensor 222 detects information indicating wheel speeds of the vehicle wheels 209.

The lift sensor 223 outputs an ON signal to the control unit 205 when the frame 252$b$ is lifted (raised) from the chassis 252$a$ by a human or the like.

The gyro sensor 224 includes a yaw sensor (angular velocity sensor) that detects a value indicating an angular velocity (yaw rate) generated about a z axis of a centroid position of the work machine 2, and a G sensor (acceleration sensor) that detects values indicating the accelerations G in X, Y, and Z (three-axis) directions, acting on the work machine 2. The sensor 202 may include a camera.

The communication unit 203 receives work information transmitted from the server 4 via the network NW under the control of the control unit 205. The communication unit 203 transmits transmission information that is output from the control unit 205 to the server 4 via the network NW. The work information includes information such as information regarding a work region and a work start time. The information regarding the work region is, for example, map information such as longitude and latitude of the work region or coordinate information of the work region based on a reference point.

The position detection unit 204 is, for example, a Global Positioning System (GPS) receiver, and detects a position of the work machine 2 (hereinafter, also referred to as an own apparatus) on the basis of information received from satellites. Alternatively, the position detection unit 204 detects a position of the own apparatus, for example, by performing communication with a base station provided near a work region. The position detection unit 204 may acquire time information on the basis of the information received from the satellites or the base station.

The control unit 205 includes a clock portion that clocks time. The control unit 205 may acquire, for example, time information from the position detection unit 204. The control unit 205 acquires the work information that is received by the communication unit 203 via the server 4, and stores the acquired work information into the storage unit 206. The control unit 205 generates a work instruction on the basis of the work information, and outputs the generated work instruction to the drive unit 207.

The control unit 205 may transmit position information detected by the position detection unit 204 to the server 4 via the communication unit 203 and the network NW.

The storage unit 206 stores the work information. The storage unit 206 stores programs, various setting values, and the like used for the control of the control unit 205.

The drive unit 207 drives the motor 208 in response to the work instruction output from the control unit 205.

Figure 2:
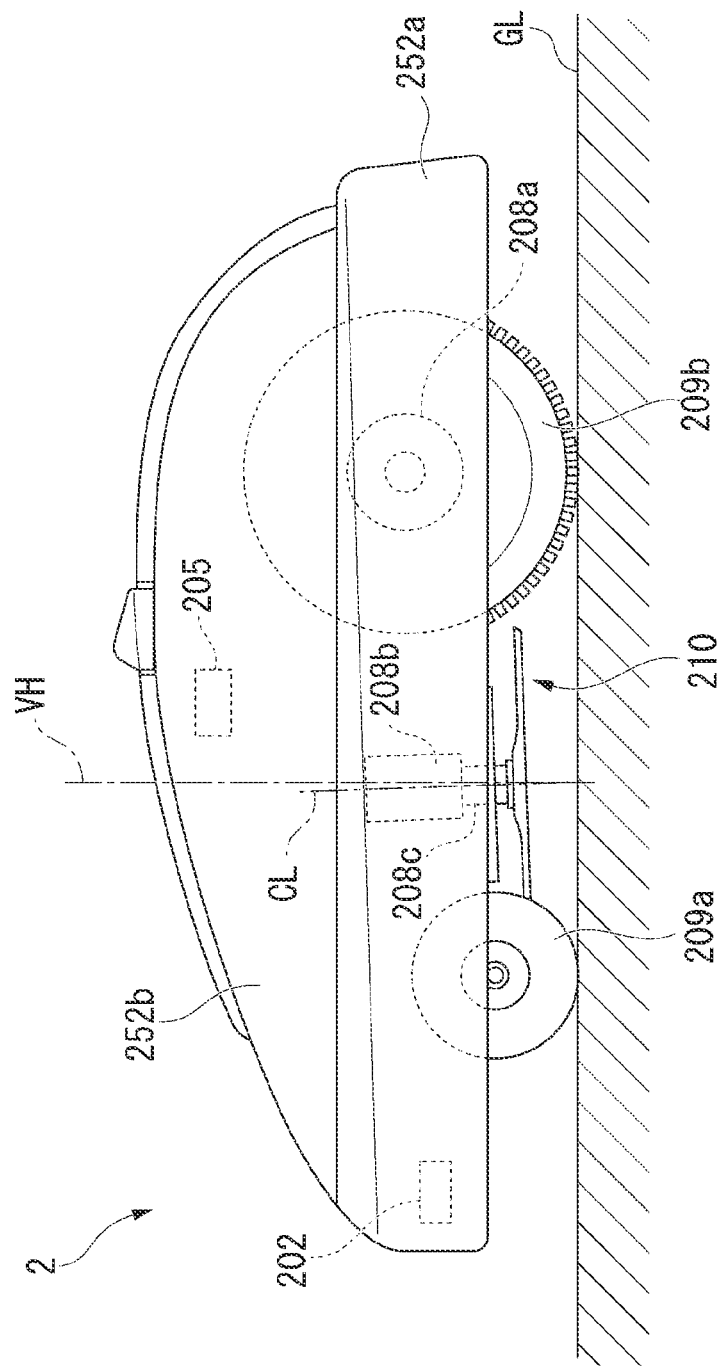
FIG. 2 is a side view of a work machine according to the embodiment.

The motor 208 includes a vehicle wheel driving motor 208a (refer to FIG. 2) and a blade cutter driving motor 208b (refer to FIG. 2). The vehicle wheel driving motor 208a drives the vehicle wheels 209. The blade cutter driving motor 208b drives the blade cutter 210.

The vehicle wheels 209 include a front wheel 209a (refer to FIG. 2) and a rear wheel 209b (refer to FIG. 2).

The blade cutter 210 is a cutter that mows a lawn.

The configuration of the work machine 2 is only an example, and is not limited thereto. For example, the work machine 2 may include an operation unit, a display unit, and the like.

<Function of Imaging Device 3>

Next, the imaging device 3 will be described.

The imaging device 3 is, for example, a drone or a satellite camera. In a case where the imaging device 3 is the drone, the imaging device 3 also includes a propeller, a motor, a drive unit, and the like (not illustrated).

The communication unit 31 transmits imaging information output from the control unit 32 to the server 4 via the network NW.

The control unit 32 correlates an image captured by the imaging unit 33 with position information acquired by the GPS reception unit 34 and a detection value detected by the sensor 35 when the image is captured. The control unit 32 outputs the imaging information in which the image is correlated with the position information and the detection value to the communication unit 31.

The imaging unit 33 images the work region, for example, at a predetermined time interval under the control of the control unit 32.

The GPS reception unit 34 acquires position information of the imaging device 3 on the basis of information received from a satellite.

The sensor 35 is, for example, a gyro sensor. The sensor 35 detects a tilt of the imaging device 3.

<Function of Server 4>

Next, the server 4 will be described.

The server 4 creates map information of a work region on the basis of an image captured by the imaging device 3. The server 4 creates work information of each work machine 2 by using the map information and work machine information regarding the work machine 2, and transmits the created work information to the work machine 2. The work machine information includes, for example, an available time of the work machine 2 or a capacity of a battery included in the power source, and lawn mowing performance (a maximum work region, a lawn mowing height range, a mowing width, a maximum climbing ability, and the like).

The communication unit 41 receives the imaging information transmitted from the imaging device 3 via the network NW. The communication unit 41 receives the transmission information transmitted from the work machine 2 via the network NW. The communication unit 41 transmits the work information output from the control unit 42 to the work machine 2 via the network NW. The work information may include identification information for identifying the work machine 2 that is a transmission destination.

The control unit 42 acquires the imaging information received by the communication unit 41, and stores the acquired imaging information into the storage unit 43. The control unit 42 acquires the transmission information received by the communication unit 41, and stores the acquired transmission information into the storage unit 43. The control unit 42 creates map information of a work region by using the imaging information, and stores the created map information into the storage unit 43. A method of creating the map information will be described later. The control unit 42 sets a work region of each work machine 2 by using the map information and the work machine information stored in the storage unit 43. A method of setting a work region will be described later. The control unit 42 outputs work information including information indicating the set work region of each work machine 2 to the communication unit 41. The control unit 42 may change the work information on the basis of the transmission information, and transmit the changed work information to the work machine 2 via the communication unit 41 and the network NW.

The storage unit 43 stores the work machine information. The storage unit 43 stores the map information. The storage unit 43 stores the imaging information. The storage unit 43 stores the transmission information. The storage unit 43 stores predetermined values used for comparison.

<Example of Appearance of Work Machine 2>

Next, an appearance example of the work machine will be described. FIG. 2 is a side view of the work machine 2 according to the present embodiment.

As illustrated in FIG. 2, the work machine 2 includes the frame 252b, the chassis 252a, the right and left front wheels 209a provided at a front part of the chassis 252a, the right and left rear wheels 209b provided at a rear part of the chassis 252a, the sensor 202, the control unit 205, the vehicle wheel driving motor 208a, the blade cutter driving motor 208b, and the blade cutter 210.

The vehicle wheel driving motor 208a is attached to, for example, each of the right and left rear wheels 209b. When the wheel drive motors 208a are rotated normally at a constant speed or in reverse at a constant speed, the work machine 2 travels straight in the front-rear direction. The work machine 2 is turned by rotating only one of the right and left wheel driving motors 208a in reverse.

The blade cutter 210 is attached to the blade cutter driving motor 208b to be capable of rotating about a rotation shaft 208c that extends in an upward-downward direction with respect to the chassis 252a. The blade cutter 210 has, for example, three blades. The blade cutter 210 is, for example, a press-molded product made of a metal plate material formed in a disk shape with the center CL of the rotation shaft 208c as the rotation center.

The rotation shaft 208c extends in the upward-downward direction of the chassis 252a. The rotation shaft 208c is substantially perpendicular to a horizontal turf GL, that is, a ground GL. Preferably, the rotation shaft 208c is slightly tilted rearward and downward from the top with respect to a vertical line VH. The reason for this is to prevent the blade cutter 210 from rubbing against a lawn surface that has been cut by the blade cutter 210 while the autonomous work machine 2 is traveling forward.

The blade cutter 210 is configured to be able to change a height thereof in the upward-downward direction of the chassis 252a under the control of the control unit 205.

<Work Region>

Next, an example of a work region will be described.

Figure 3:
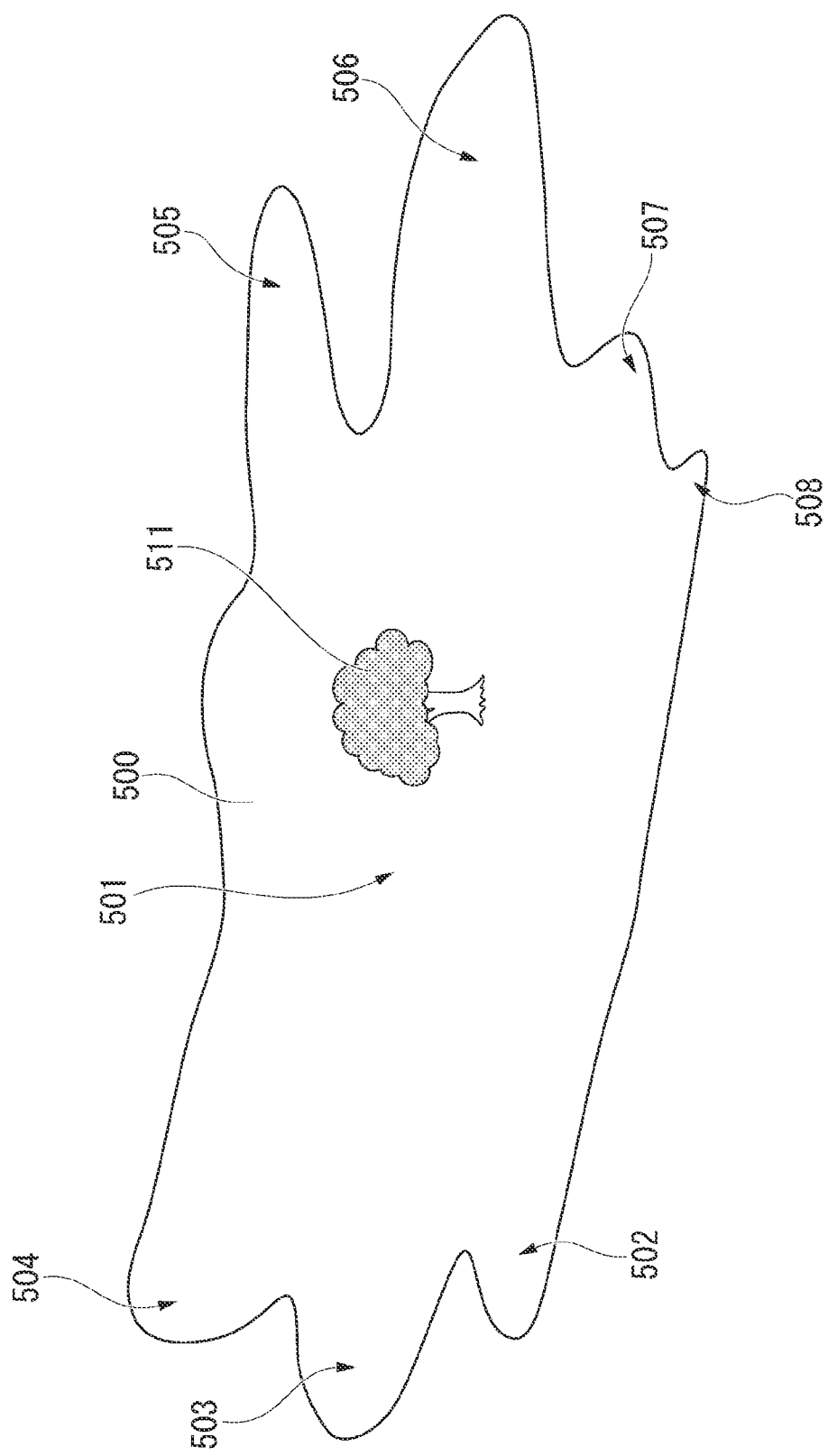
FIG. 3 is a diagram illustrating an example of the entire work region.

FIG. 3 is a diagram illustrating an example of the entire work region 500. The entire work region 500 is, for example, a park. As illustrated in FIG. 3, the entire work region 500 has a horizontally long shape, and has a central portion 501 and protrusions 502 to 508 with irregularities in the longitudinal direction.

Trees 511 are planted in the central portion 501.

In the related art, in lawn mowing work in the entire work region 500 as illustrated in FIG. 3, for example, a worker mows a wide range of lawn with an engine-type riding lawnmower, and the worker mows a lawn while pushing a walking lawnmower by hand around a tree that cannot be mowed with the riding lawnmower. Thereafter, the worker performs mowing with a grass cutter in a region that the walking lawnmower cannot enter. The described work content and procedures are only examples.

In a case where lawn mowing in the entire work region 500 as illustrated in FIG. 3 is performed by the work machine 2, there is a region that the first work machine 2-1 cannot enter. In a case where lawn mowing is performed in all regions by using the second work machine 2-2 having a small turning radius, a work time increases compared with a case where the first work machine 2-1 is used. Thus, in the present embodiment, the server 4 creates a plan to perform efficient work by using at least two work machines 2 having different functions.

Figure 4:
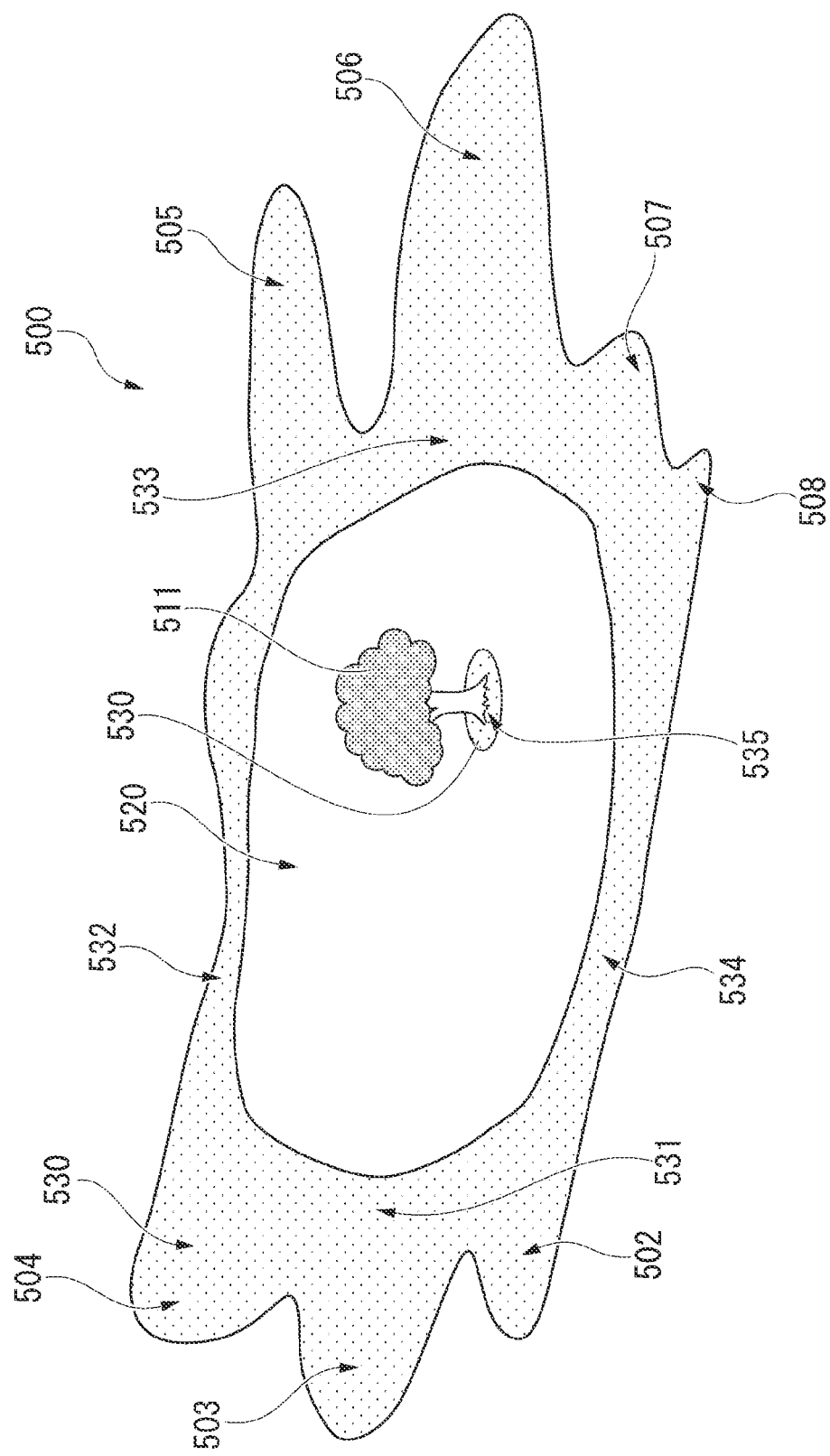
FIG. 4 is a diagram illustrating a work region example of two work machines according to the embodiment.

FIG. 4 is a diagram illustrating a work region example of two work machines 2 according to the present embodiment. A wide first work region 520 (first work region) at the center is a region in which the first work machine 2-1 performs work. A second work region 530 (second work region) other than the first work region 520 in the entire work region 500 is a region in which the second work machine 2-2 performs work. The second work region 530 includes the protrusions 502 to 508, a region 531 between the protrusions 502 to 504 and the first work region 520 in the longitudinal direction, edge regions 532 and 534 (boundary portions between the entire work region 500 and a non-work region) outside the first work region 520 in the lateral direction, a region 533 between the protrusions 505 to 508 and the first work region 520 in the longitudinal direction, and a peripheral region 535 of trees. Each work region is a turf (a green part in the image) in which a lawn grows.

As described above, in the present embodiment, as illustrated in FIG. 4, the server 4 allocates the central portion or a region having no obstacle to a first work region, and allocates the periphery of an obstacle or an edge of a work region to a second work region. The server 4 may set a work region of the first work machine 2-1 to maximize work efficiency of the first work machine 2-1. For example, the server 4 may set a shape of a work region to increase the number of sections in which work can be performed at the maximum speed by reducing a turning location.

<Setting of Work Region>

First, a description will be made of an example of a work procedure performed by the imaging device 3.

Figure 5:
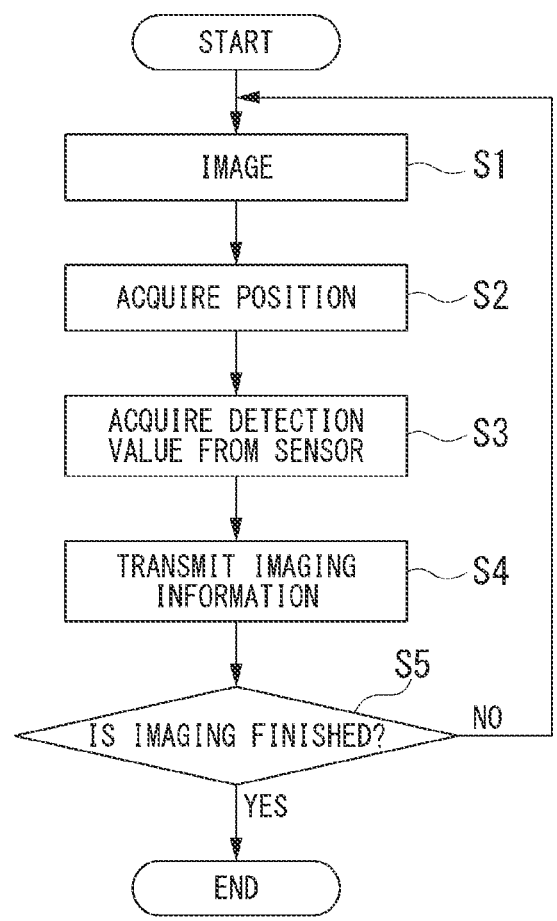
FIG. 5 is a flowchart illustrating a work procedure performed by an imaging device according to the embodiment.

FIG. 5 is a flowchart illustrating a work procedure performed by the imaging device 3 according to the present embodiment.

(Step S1) The imaging unit 33 images a work region at a predetermined time interval.

(Step S2) The GPS reception unit 34 acquires position information at a predetermined time interval.

(Step S3) The sensor 35 detects a tilt of the imaging device 3. The control unit 32 acquires a detection value detected by the sensor 35.

(Step S4) The control unit 32 transmits imaging information in which the image is correlated with the position information and the detection value to the server 4 via the communication unit 31 and the network NW at a predetermined time interval.

(Step S5) The control unit 32 determines whether or not imaging in all regions of the entire work region 500 has been finished. In a case where it is determined that the imaging has been finished (step S5; YES), the control unit 32 finishes the process. In a case where it is determined that the imaging has not been finished (step S5; NO), the control unit 32 returns to the process in step S1.

Next, a description will be made of a procedure example in which the server 4 creates map information.

Figure 6:
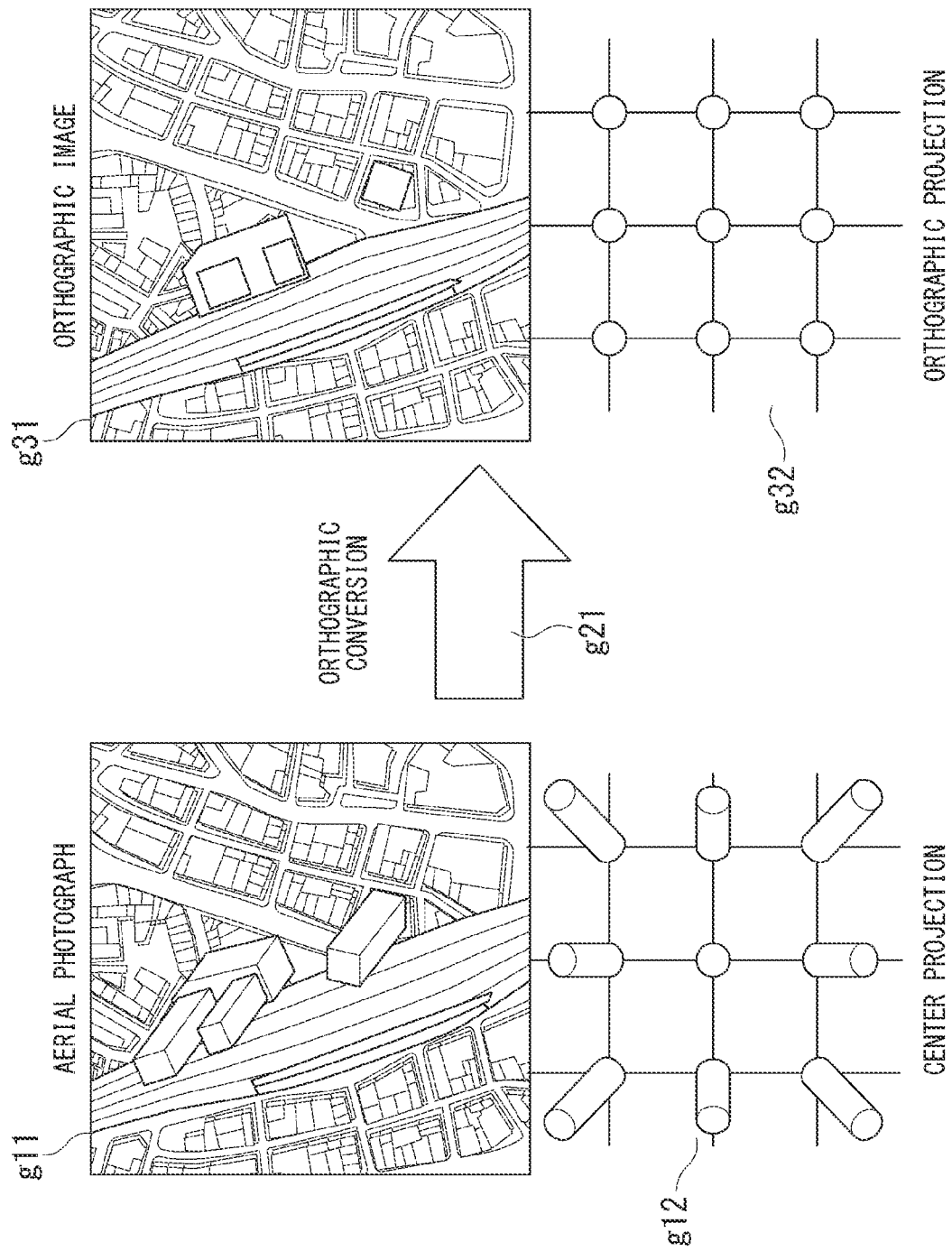
FIG. 6 is a diagram for describing conversion of a captured image.

FIG. 6 is a diagram for describing conversion of a captured image.

An image captured by the imaging unit 33 is an image layer g11 in center projection (g12) having the center of a lens of the imaging unit 33 as a viewpoint. Thus, positional deviations occur in forms on the image due to a distance difference between the center of the lens and a target object. As in g12, as a target object captured in the image becomes higher from the ground, and is directed toward a peripheral edge from the center of the image, the positional deviation increases. In an aerial photograph taken from the sky by a drone, a positional deviation occurs due to undulations (height difference) of the land.

Thus, the control unit 42 converts (orthographic conversion g21) the image in the center projection into an image in orthographic projection (g32) such as a map in which the forms are displayed with correct sizes and at correct positions and have no tilts as seen from directly above by eliminating the positional deviations in the forms on the image in the aerial photograph, and thus generates an orthographic image (g31). In the orthographic image, a captured form has a correct shape and is disposed at a correct position, and thus a position, an area, and a distance thereof can be accurately measured on the image.

The control unit 42 performs orthographic conversion on aerial photographs in the center projection by using an orienting point and a verification point that are set in advance, and combines the converted images with each other to create the orthographic image. The orienting point is a point (longitude and latitude) used as a reference of a horizontal position and a height. The verification point is a point (longitude and latitude) provided to verify measured data separately from the orienting point. The map used in the present embodiment is not a map used for accurate measurement but is used to set a work region of the work machine 2. Thus, the orienting point or the verification point may be located in the entire work region 500, and may be located outside the entire work region 500. Alternatively, the verification point does not need to be provided.

Figure 7:
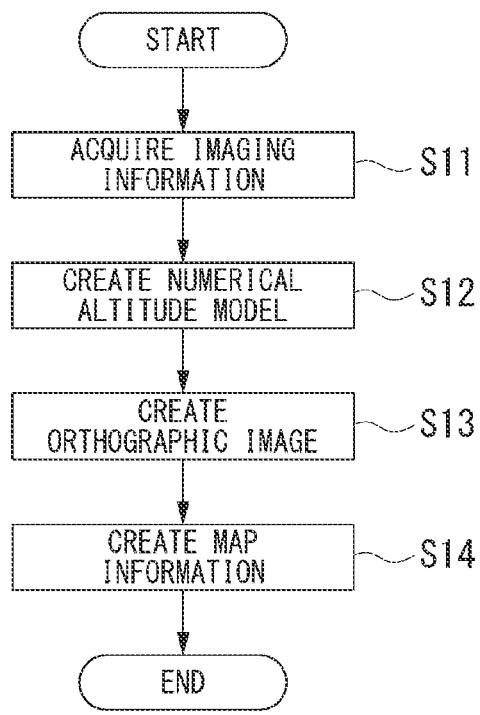
FIG. 7 is a flowchart illustrating a map creation procedure according to the embodiment.

FIG. 7 is a flowchart illustrating a map creation procedure according to the present embodiment.

(Step S11) The control unit 42 acquires imaging information obtained by the imaging device 3 via the network NW and the communication unit 41, and stores the acquired imaging information into the storage unit 43.

(Step S12) The control unit 42 automatically computes an altitude of a feature from a position on an image by three-dimensionally plotting an aerial photograph on the basis of photogrammetry or comparing information captured in aerial photograph overlapping each other, and measures an altitude value of each point on the image. Next, the control unit 42 connects three measurement points adjacent to each other among measurement points to make a triangle, and creates a numerical altitude mode representing an altitude in a grid shape at an equal interval by using interpolation applied to a shape of a ground surface.

(Step S13) The control unit 42 performs orthographic conversion for correcting a positional deviation on the photograph on the aerial photograph in the center projection by using the numerical altitude model, to create an orthographic image. Orthographic images are respectively created from captured aerial photographs, and thus the control unit 42 joins (mosaics) joints of the orthographic images not to be conspicuous and creates one integrated orthographic image.

(Step S14) The control unit 42 creates map information by using the created orthographic image.

The control unit 42 extracts only a turf from the entire work region through image processing, and causes information indicating a region of the extracted turf to be included in the map information. The control unit 42 extracts a turf and edges of other regions through image processing, and causes information indicating the extracted edges to be included in the map information.

In the above example, a description has been made of an example in which the map information is created by using the orthographic image, but the present invention is not limited thereto. The control unit 42 may measure a distance from a point A to a specific point B, calculate an embankment volume, create a 3D model, and create a drawing, for example, by using point group data which is information of XYZ axes acquired from the air by the drone. Alternatively, the server 4 may create map information on the basis of, for example, measured data that is obtained by causing a work machine including a GPS to actually travel in a work target region. Alternatively, regarding two-dimensional map information, the server 4 may provide an altitude sensor in a work target region, cause a work machine for measuring an altitude to travel in the work target region, and create map information having height information on the basis of obtained altitude information.

<Method of Setting Work Region of Each Work Machine 2>

Next, a description will be made of an example of a method of the server 4 setting a work region of each work machine 2.

Figure 8:
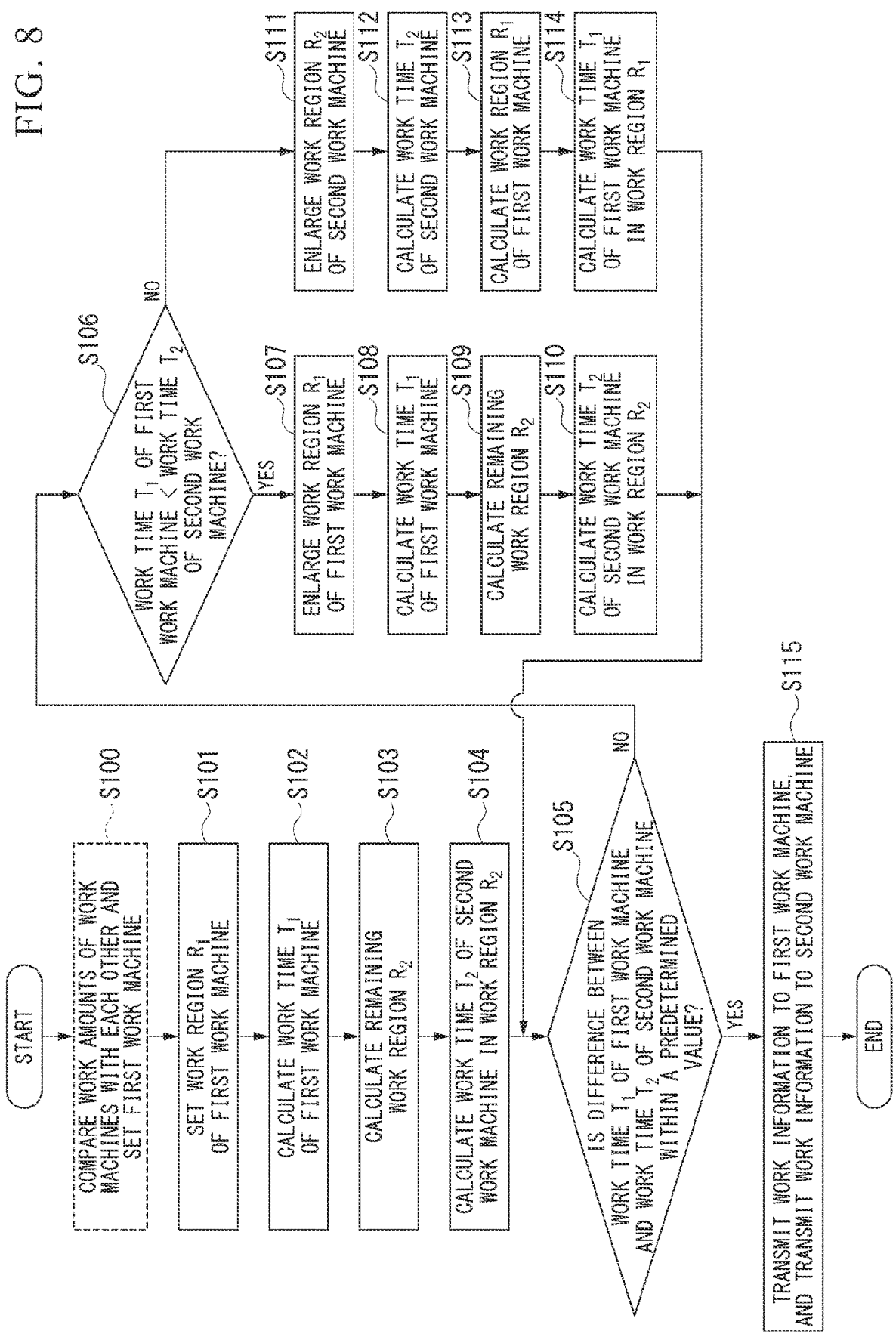
FIG. 8 is a flowchart illustrating a procedure of a server setting a work region of each work machine according to the embodiment.

In the following description, a description will be made of an example in which there are two work machines 2 (the first work machine 2-1 and the second work machine 2-2). FIG. 8 is a flowchart illustrating a procedure of the server 4 setting a work region of each work machine 2 according to the present embodiment.

(Step S100) The control unit 42 compares working capacities of a plurality of work machines 2 on the basis of information regarding the work machines 2 stored in the storage unit 43, and sets the work machine 2 having a higher working capacity to the first work machine 2-1. In a case where the work machine 2 having a higher working capacity is known in advance, this process does not need to be performed.

(Step S101) The control unit 42 temporarily sets a first work region $R_1$ (an area and a position) (first work region) of the first work machine 2-1 by using the map information and work machine information stored in the storage unit 43. In a case where a working capacity of the first work machine 2-1 is higher than that of the second work machine 2-2, the control unit 42 temporarily sets an area of the first work region $R_1$ on the basis of the working capacity of the first work machine 2-1.

(Step S102) The control unit 42 calculates a first work time $T_1$ (first work time) required for the first work machine 2-1 to perform work in the first work region $R_1$ that is temporarily set by using the map information and the work machine information stored in the storage unit 43. When the first work time $T_1$ is calculated, the control unit 42 sets the shortest path causing the first work time $T_1$ to be the minimum on the basis of a work start position (longitude and latitude), a work route, and a work end position (longitude and latitude) of the first work machine 2-1, according to a well-known method (for example a Dijkstra method).

(Step S103) The control unit 42 calculates a remaining work region $R_2$ (area and position) by using the map information and the first work region $R_1$ that is temporarily set in step S101.

(Step S104) The control unit 42 temporarily sets a second work region $R_2$ (area and position) (second work region) in which the second work machine 2-2 performs work by using the remaining work region $R_2$ calculated in step S103 and the work machine information stored in the storage unit 43. Next, the control unit 42 calculates a second work time $T_2$ (second work time) required for the second work machine 2-2 to perform work in the second work region $R_2$ that is temporarily set by using the map information and the work machine information stored in the storage unit 43. When the second work time $T_2$ is calculated, the control unit 42 sets the shortest path causing the second work time $T_2$ to be the minimum on the basis of a work start position (longitude and latitude), a work route, and a work end position (longitude and latitude) of the second work machine 2-2, according to a well-known method.

(Step S105) The control unit 42 determines whether or not a difference between the first work time $T_1$ and the second work time $T_2$ is within a predetermined value. In a case where it is determined that the difference between the first work time $T_1$ and the second work time $T_2$ is within the predetermined value (step S105; YES), the control unit 42 proceeds to a process in step S115. In a case where it is determined that the difference between the first work time $T_1$ and the second work time $T_2$ more than the predetermined value (step S105; NO), the control unit 42 proceeds to a process in step S106.

(Step S106) The control unit 42 determines whether or not the first work time $T_1$ is less than the second work time $T_2$. In a case where the first work time $T_1$ is less than the second work time $T_2$ (step S106; YES), the control unit 42 proceeds to the process in step S107. In a case where the first work time $T_1$ is equal to or more than the second work time $T_2$ (step S106; NO), the control unit 42 proceeds to the process in step S111.

(Step S107) The control unit 42 enlarges the first work region $R_1$.

(Step S108) The control unit 42 calculates the first work time $T_1$ required for work in the enlarged first work region $R_1$ by using the map information and the work machine information stored in the storage unit 43.

(Step S109) The control unit 42 calculates the remaining work region $R_2$ by using the map information and the enlarged first work region $R_1$.

(Step S110) The control unit 42 resets the second work region $R_2$ by using the remaining work region $R_2$ and the work machine information stored in the storage unit 43. Next, the control unit 42 calculates the second work time $T_2$ required for work in the reset second work region $R_2$ by using the map information and the work machine information stored in the storage unit 43. After the process, the control unit 42 returns to the process in step S105.

(Step S111) The control unit 42 enlarges the second work region $R_2$.

(Step S112) The control unit 42 calculates the second work time $T_2$ required for work in the enlarged second work region $R_2$ by using the map information and the work machine information stored in the storage unit 43.

(Step S113) The control unit 42 calculates the remaining work region $R_1$ by using the map information and the enlarged second work region $R_2$.

(Step S114) The control unit 42 resets the first work region $R_1$ by using the remaining work region $R_1$ and the work machine information stored in the storage unit 43. Next, the control unit 42 calculates the first work time $T_1$ required for work in the reset first work region $R_1$ by using the map information and the work machine information stored in the storage unit 43. After the process, the control unit 42 returns to the process in step S105.

(Step S115) The control unit 42 generates work information for the first work machine 2-1, and generates work information for the second work machine 2-2. Next, the control unit 42 transmits the work information for the first work machine 2-1 to the first work machine 2-1 via the communication unit 41 and the network NW. The control unit 42 transmits the work information for the second work machine 2-2 to the second work machine 2-2 via the communication unit 41 and the network NW.

In step S101, the control unit 42 may temporarily set the first work region $R_1$ on the basis of the capacities (for example, mowing widths) of the first work machine 2-1 and the second work machine 2-2, and may store a ratio between the working capacities of the first work machine 2-1 and the second work machine 2-2 as an initial value in the storage unit 43 in advance. For example, in a case where the initial value is 0.7, the control unit 42 may obtain an area of the entire work region, and set a central region corresponding to 70% of the entire area as the first work region $R_1$.

In step S106, a description has been made of an example in which it is determined whether or not the difference between the first work time $T_1$ and the second work time $T_2$ is within the predetermined value, but the present invention is not limited thereto. The control unit 42 may determine that a ratio between the first work time $T_1$ and the second work time $T_2$ is within a predetermined value. In this case, when it is determined that the ratio between the first work time $T_1$ and the second work time $T_2$ is equal to or more than the predetermined value (step S106; YES), the control unit 42 may proceed to the process in step S107. In a case where it is determined that the ratio between the first work time $T_1$ and the second work time $T_2$ is less than the predetermined value (step S106; NO), the control unit 42 may proceed to the process in step S111.

In FIG. 8, a description has been made of an example in which a work region is set by using two work machines 2, but the present invention is not limited thereto. The server 4 may set a work region of each of three or more work machines 2. For example, a description will be made of an example of using one first work machine 2-1 and two second work machines 2-2. In the following description, the two second work machines 2-2 will be respectively referred to as a second work machine 2-21 and a third work machine 2-22.

The control unit 42 performs the processes in steps S101 to S103.

The control unit 42 divides the second work region $R_2$ into a second work region $R_{21}$ and a third work region $R_{22}$. The control unit 42 allocates work in the second work region $R_{21}$ to the second work machine 2-21, and allocates work in the third work region $R_{22}$ to the third work machine 2-22.

The control unit 42 calculates the first work time $T_1$ required for the first work machine 2-1 to perform work in the first work region $R_1$. The control unit 42 calculates a second work time $T_{21}$ required for the second work machine 2-21 to perform work in the second work region $R_{21}$, and calculates a third work time $T_{22}$ required for the third work machine 2-22 to perform work in the third work region $R_{22}$.

The control unit 42 adjusts the first work region $R_1$, the second work region $R_{21}$, and the third work region $R_{22}$ such that a difference between the first work time $T_1$ and the second work time $T_{21}$ is within a predetermined value, a difference between the first work time $T_1$ and the third work time $T_{22}$ is within a predetermined value, and a difference between the second work time $T_{21}$ and the third work time $T_{22}$ is within a predetermined value.

In a case where the number of plural work machines 2 is, for example, three, capacities of the respective three work machines 2 may be different from each other. In this case, the control unit 42, for example, may allocate a work region in descending order of a mowing width, and may temporarily allocate a work region in ascending order of a mowing width.

As described above, in the present embodiment, the server 4 adjusts the work regions to be allocated to the respective work machines 2 such that work times of the plurality of work machines 2 are substantially the same as each other, that is, work of the plurality of work machines 2 is finished at the substantially same time.

Thus, in the present embodiment, an image of the whole of the work region (entire work region) is acquired in the work region by using the imaging device 3 such as a drone or a satellite camera. The first work machine 2-1 having high efficiency is set to perform work in the turf (green part) of the entire work region. In the present embodiment, for example, the second work machine 2-2 is set to perform work in the shading part such as a tree or an obstacle. The server 4 computes an area of each region, and estimates a required work time on the basis of a working capacity of each work machine 2. The server 4 sets the first work region and the second work region such that estimated work end times of the first work machine 2-1 and the second work machine 2-2 are the same as each other.

As described above, according to the present embodiment, work times of a plurality of work machines match each other on the basis of work regions and capacities of the work machines, and thus it is possible to maximize work efficiency when work is performed by using the plurality of work machines. As a result, according to the present embodiment, it is possible to maximize work efficiency. According to the present embodiment, a work end time can be estimated on the basis of an estimated work time. According to the present embodiment, a worker, a work supporter, or a manager checks an estimated work end time, and thus a work schedule is easily set.

Figure 9:
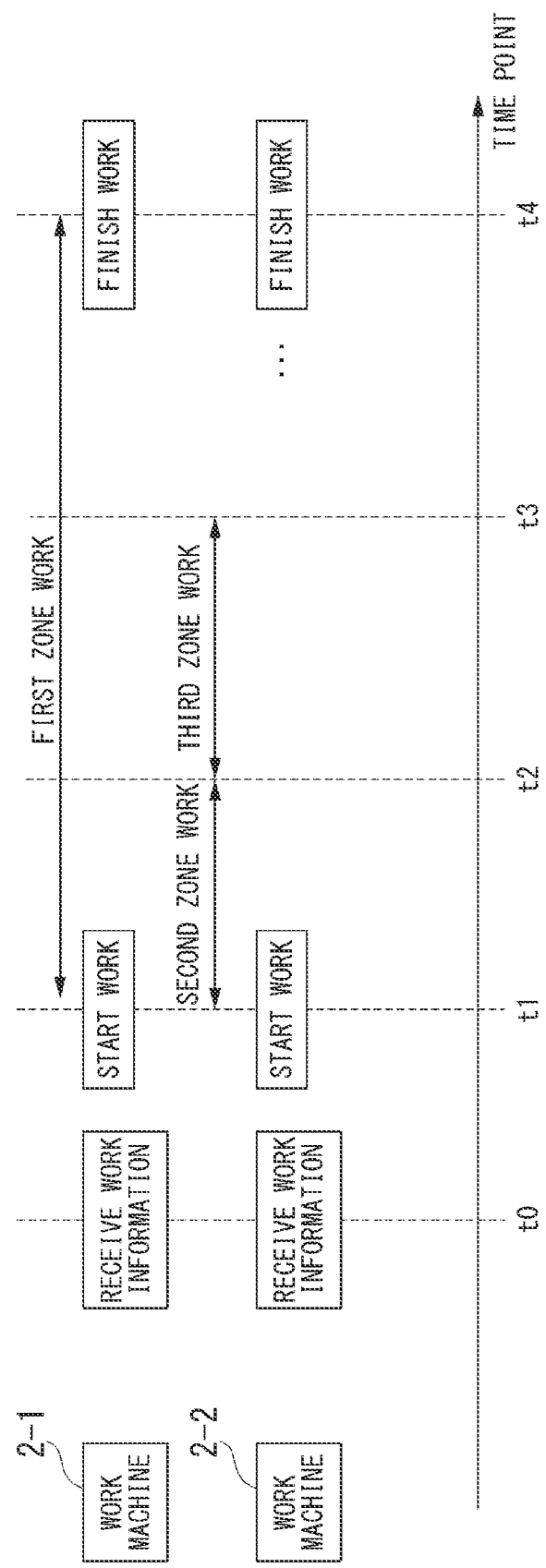
FIG. 9 is a diagram illustrating an example of a work time for two work machines according to the embodiment.

FIG. 9 is a diagram illustrating an example of work times of two work machines 2 according to the present embodiment. In the example illustrated in FIG. 9, allocation of a work region to the work machine 2 in the server 4 is finished.

At time point t0, each of the first work machine 2-1 and the second work machine 2-2 receives work information transmitted from the server 4 via the network NW. The work information includes identification information for identifying a transmission partner, and the identification information is stored in the storage unit 206-1 of the first work machine 2-1 and the storage unit 206-2 of the second work machine 2-2. The control unit 205-n acquires work information for its own apparatus on the basis of the identification information included in the received work information.

A work region of the first work machine 2-1 is assumed to be a first zone (for example, the first work region 520 in FIG. 4). A work region of the second work machine 2-2 is assumed to be a plurality of zones (a second zone, a third zone, . . . , and an m-th zone (where m is an integer of 3 or greater)) (for example, the second work region 530 in FIG. 4).

At time point t1, the first work machine 2-1 starts work in the first zone. The second work machine 2-2 starts work in the second zone.

At time point t2, the second work machine 2-2 finishes the work in the second zone, and starts work in the third zone. The first work machine 2-1 continues the work in the first zone.

At time point t3, the second work machine 2-2 finishes the work in the third zone, and starts work in the fourth zone. The first work machine 2-1 continues the work in the first zone.

At time point t4, the first work machine 2-1 finishes the work in the first zone, and the second work machine 2-2 finishes the m-th zone. Time point t4 is a time point having a range, and is, for example, 3:55 p.m. to 4:00 p.m.

Here, the reason why the work times of a plurality of work machines 2 are substantially the same as each other will be described.

For example, lawn mowing work in a park or the like may be outsourced to a lawn mowing contractor. In such a case, the contractor transports a lawnmower necessary for the work, for example, by truck. The contractor wants to make effective use of the owned lawnmower. Thus, in a case where the first work machine 2-1 and the second work machine 2-2 are transported to the park, for example, when the first work machine 2-1 finishes the work first, it is inefficient to transport only the first work machine 2-1 to other parks and the like that outsource the work. When work of the first work machine 2-1 and work of the second work machine 2-2 are finished at the substantially same time, the contractor can transport the two work machines 2 together to another park or the like to perform the work.

Thus, in the present embodiment, work regions are set such that work times of a plurality of work machines 2 are substantially the same as each other. Consequently, according to the present embodiment, it is possible to maximize work efficiency when work is performed by using a plurality of apparatuses.

In the above example, a description has been made of the example in which the working capacity of the first work machine 2-1 is higher than that of the second work machine 2-2, but the present invention is not limited thereto. The working capacity of the first work machine 2-1 may be the same as that of the second work machine 2-2. Alternatively, the working capacity of the second work machine 2-2 may be higher than that of the first work machine 2-1.

In the above example, a description has been made of the example of calculating a work time, but the present invention is not limited thereto. The control unit 42 may calculate a work end time. In this case, the control unit 42 may set a work region of each work machine 2 such that a work end time of each work machine 2 is within a predetermined range (for example, within ten minutes). For example, even in a case where only the first work machine 2-1 can start work at time point t1 due to the convenience of securing the work machine 2, for example, when the second work machine 2-2 can start the work from time point t2, the control unit 42 may set work regions such that the work of the first work machine 2-1 and the work of the second work machine 2-2 are finished at time point t4. As described above, in a case where the work machine 2 is added later, the control unit 42 may set work regions such that a difference between $(T_1-T_{202})$ and $T_1$ is within a predetermined value by using the first work time $T_1$, the second work time $T_2$, and a time Tall until the second work machine 2-2 participates in work.

MODIFICATION EXAMPLES

Hereinafter, modification examples of the embodiment will be described.

First Modification Example

For example, there is a case where an obstacle (for example, a lost article) that is not present when a map is created on the basis of an image captured by a drone may be present during work in a work region. In this case, the work machine 2 may transmit a detection value detected by the sensor 202 to the server 4 via the network NW.

In a case where the information regarding the obstacle is received from the work machine 2, the server 4 may correct the work region and also correct work information. The server 4 may transmit the corrected work information to the work machine 2 via the network NW.

Consequently, according to the present embodiment, even in a case of the occurrence of a change in a work region such as an increase in the number of obstacles after a map is created, it is possible to appropriately set a work region.

Second Modification Example

In the present embodiment, for example, a description will be made of the example in which the imaging device 3 is a drone, but the present invention is not limited thereto. The imaging device 3 may be provided in, for example, at least one of the first work machine 2-1 and the second work machine 2-2. In this case, the work machine 2 may transmit captured image correlated with position information to the server 4 via the network NW. The server 4 may generate two-dimensional map information by using, for example, a simultaneous localization and mapping (SLAM) method (for example, refer to Reference 1).

Reference 1: S. Kohlbrecher and J. Meyer and O. von Stryk and U. Klingauf, "A Flexible and Scalable SLAM System with Full 3D Motion Estimation", in Proc. of IEEE International Symposium on Safety, Security and Rescue Robotics (SSRR), pp. 155 to 160, 2011.

Third Modification Example

A description will be made of the example in which the server 4 executes the map creation function or the work region allocation work, but the present invention is not limited thereto. For example, a master device of the work machine 2, for example, the first work machine 2-1 may execute the map creation function or the work region allocation work. In this case, the first work machine 2-1 may execute the map creation function or the work region allocation work to transmit work information to another work machine 2.

Fourth Modification Example

The server 4 may calculate a work time of the work machine 2 in consideration of the type of lawn, a growing state of the lawn, the season, the weather, and the like.

Fifth Modification Example

In the above example, a description will be made of the example in which the number of work machines 2 used for work is set in advance, but the present invention is not limited thereto. For example, it is assumed that two work machines 2 are used to mow a lawn in a park A in the morning and mow a lawn in a park B in the afternoon. After work is started in the park A, there may be more obstacles, or the lawn may be growing more than expected and thus an amount of the mowed lawn may be large. In this case, the two work machines 2 may not be able to finish the work in the morning.

In such a case, each of the work machines 2 may transmit position information detected by the position detection unit 204 to the server 4 via the network NW during work after a predetermined time or at a predetermined time point. The position information may be, for example, obstacle information indicating a position where an obstacle is present.

The server 4 compares the acquired position information with the schedule illustrated in FIG. 9. The control unit 42 of the server 4 may calculate a work region or a work time, then calculate a schedule of each work machine 2, and store information regarding the calculated schedule into the storage unit 43. For example, the schedule may be information such as completed work relative to scheduled work every predetermined time from a work start time or a position (longitude and latitude) where the work machine 2 is performing work. In a case where work is delayed, for example, in a case where work of the second work machine 2-2 is delayed, the control unit 42 may add the work machine 2. In this case, the control unit 42 may update the calculated work region and work time to include the added work machine 2, and transmit the updated work information to the work machine 2 during work and the added work machine 2.

The control unit 42 may transmit information regarding a created schedule to a work manager or the terminal 5 or the like carried by a worker.

Consequently, the work manager or the worker can check an estimated work end time or the time required for work, and can thus easily set a schedule of work performed by the work machine 2 (for example, in a case where the work is finished in the morning, a schedule of another work is set in the afternoon).

In the above-described embodiment or modification examples, a description has been made of an example in which the work machine 2 is a lawnmower, but the present invention is not limited thereto. The plurality of work machines 2 may be, for example, self-propelled grass cutters or self-propelled blowers (apparatuses returning cut grass to a site) in addition to the lawnmower.

The work machine 2 may be an apparatus that performs work in a predetermined region with a plurality of work machines. For example, the work machine 2 may be a self-propelled cleaning robot, a self-propelled transport apparatus in a factory, or a self-propelled monitoring apparatus.

A program for realizing all or some of the functions of the work machine 2, all or some of the functions of the imaging device 3, and all or some of the functions of the server 4 in the present invention may be recorded on a computer-readable recording medium, and the program recorded on the recording medium may be read into a computer system and is executed such that all or some of the processes performed by the work machine 2, all or some of the processes performed by the imaging device 3, and all or some of the processes performed by the server 4 are performed. The "computer system" mentioned here includes an OS or hardware such as peripheral devices. The "computer system" includes a WWW system provided with a homepage provision environment (or display environment). The "computer readable recording medium" refers to, for example, a portable medium such as a flexible disk, a magnetooptical disc, a ROM, or a CD-ROM, or a storage device such as a hard disk built into a computer system. The "computer-readable recording medium" includes a medium that stores the program for a predetermined time, such as a volatile memory (RAM) inside the computer system serving as a server or a client when the program is transmitted via a network such as the Internet or a communication line such as a telephone line.

The program may be transmitted from a computer system that stores the program in a storage device or the like to another computer system via a transmission medium or a transmission wave in the transmission medium. Here, the "transmission medium" for transmitting the program refers to a medium having a function of transmitting information, such as a network (communication network) such as the Internet or a communication line (communication cable) such as a telephone line. The program may be a program for realizing some of the functions described above. The program may be a so-called difference file (difference program), which can realize the above-mentioned function in combination with a program already recorded in the computer system.

Although embodiments for carrying out the present invention have been described by using the embodiments, the present invention is not limited to these embodiments, and various modifications and alternations may occur within the scope without departing from the concept of the present invention.

What is claimed is:

1. An autonomous work system comprising:
a first work machine;
a second work machine; and
a setting apparatus,
wherein the setting apparatus
sets a part of an entire work region as a first work region in which the first work machine performs work, and calculates a first work time required for the first work machine to perform the work in the first work region,
sets a region other than the first work region in the entire work region as a second work region in which the second work machine performs work, and calculates a second work time required for the second work machine to perform the work in the second work region,
changes the first work region and the second work region such that a difference between the first work time and the second work time is within a predetermined value,
transmits information regarding the changed first work region to the first work machine, and
transmits information regarding the changed second work region to the second work machine.

2. The autonomous work system according to claim 1, wherein the setting apparatus
compares a working capacity of the first work machine with a working capacity of the second work machine, and sets a work machine having a higher working capacity as the first work machine, and
sets an area of the first work region on the basis of the working capacity of the first work machine.

3. The autonomous work system according to claim 1, wherein the setting apparatus acquires obstacle information indicating a position of an obstacle from at least one of the first work machine and the second work machine, and changes the first work region and the second work region on the basis of the acquired obstacle information.

4. The autonomous work system according to claim 1, wherein the first work machine and the second work machine are lawnmowers, and
wherein, in a case where a working capacity of the first work machine is higher than a working capacity of the second work machine, the setting apparatus sets at least a boundary portion of the entire work region as the second work region.

5. An autonomous work setting method comprising:
setting a part of an entire work region as a first work region in which a first work machine performs work, and calculating a first work time required for the first work machine to perform the work in the first work region;
setting a region other than the first work region in the entire work region as a second work region in which a second work machine performs work, calculating a second work time required for the second work machine to perform the work in the second work region, and changing the first work region and the second work region such that a difference between the first work time and the second work time is within a predetermined value;
transmitting information regarding the changed first work region to the first work machine; and
transmitting information regarding the changed second work region to the second work machine.

6. A computer-readable non-transitory storage medium storing a program causing a computer to execute:
setting a part of an entire work region as a first work region in which a first work machine performs work;
calculating a first work time required for the first work machine to perform the work in the first work region;
setting a region other than the first work region in the entire work region as a second work region in which a second work machine performs work;
calculating a second work time required for the second work machine to perform the work in the second work region;
changing the first work region and the second work region such that a difference between the first work time and the second work time is within a predetermined value;
transmitting information regarding the changed first work region to the first work machine; and
transmitting information regarding the changed second work region to the second work machine.

* * * * *